United States Patent
Elvig

(10) Patent No.: US 9,145,537 B2
(45) Date of Patent: Sep. 29, 2015

(54) MASHING PROCESS

(75) Inventor: Niels Elvig, Holte (DK)

(73) Assignee: NOVOZYMES A/S, Bagsvaerd (DK)

( * ) Notice: Subject to any disclaimer, the term of this patent is extended or adjusted under 35 U.S.C. 154(b) by 209 days.

(21) Appl. No.: 12/294,450

(22) PCT Filed: Apr. 3, 2007

(86) PCT No.: PCT/EP2007/053222
§ 371 (c)(1),
(2), (4) Date: Oct. 20, 2008

(87) PCT Pub. No.: WO2007/113292
PCT Pub. Date: Oct. 11, 2007

(65) Prior Publication Data
US 2010/0260889 A1    Oct. 14, 2010

Related U.S. Application Data

(60) Provisional application No. 60/789,213, filed on Apr. 4, 2006.

(30) Foreign Application Priority Data

Apr. 4, 2006    (DK) .................................. 2006 00483

(51) Int. Cl.
*C12C 11/00*    (2006.01)
*C12C 7/047*    (2006.01)
*C12C 5/00*    (2006.01)

(52) U.S. Cl.
CPC ................. *C12C 7/047* (2013.01); *C12C 5/004* (2013.01)

(58) Field of Classification Search
CPC .......... C12C 11/003; C12C 5/02; C12C 7/00; C12C 7/04; C12C 5/004; C12C 7/047; C12N 9/00
USPC ..................... 426/12, 28, 29, 64, 93
See application file for complete search history.

(56) References Cited

U.S. PATENT DOCUMENTS

| 2,790,718 | A | | 4/1957 | Nugey et al. | |
| 3,081,172 | A | | 3/1963 | Dennis et al. | |
| 3,353,960 | A | * | 11/1967 | Bavisotto | ........................ 426/29 |
| 3,795,745 | A | | 3/1974 | Wlkes et al. | |
| 2004/0219649 | A1 | * | 11/2004 | Olsen et al. | ................... 435/161 |
| 2004/0265425 | A1 | * | 12/2004 | Yasui et al. | ..................... 426/16 |

FOREIGN PATENT DOCUMENTS

| CN | 1461803 | | 12/2003 |
| WO | WO 00/60059 | | 10/2000 |
| WO | WO 02/092797 | | 11/2002 |
| WO | WO03066826 | * | 8/2003 |
| WO | WO 2004/011591 | | 2/2004 |
| WO | WO 2004/113551 | | 12/2004 |
| WO | WO 2005/001064 | | 1/2005 |
| WO | WO 2005/121305 | | 12/2005 |
| WO | WO 2006/136161 | | 12/2006 |

OTHER PUBLICATIONS

Goode, D. L. et al. 2003. J. Inst. Brew. 109:208-217.*
Swanston et al, Journal of the Science of Food and Agriculture, vol. 81, pp. 594-603 (2001).
Wieg et al, Process Biochemistry, vol. 4, No. 5, pp. 33-38 (1969).
S.A. Sorensen, Microbial Enzymes for Brewing, pp. 60-62 (1970).
Wieg et al, Process Biochemistry, vol. 5, No. 8, pp. 46-48 (1970).
Hoff et al, XP-002447025, Acc No. ADW71769 (2005).
Viksoe-Nielsen et al, XP-002447026 Acc. No. CQ975852 (2005).
Gregory et al, XP-002447027, Acc. No. CS476449 (2007).
Svendsen et al, XP-002447028, Acc. No. ADJ92082 (2004).
Svendsen et al, XP-002447029, Acc. No. AX036895 (2000).
Glavachek et al, Beer Brewing, Moscow, Pishchevaya promishlennost, p. 31 (1997).
Wang Yichen, Food and Fermentation Industries, vol. 04, pp. 70-77 (1983).

* cited by examiner

*Primary Examiner* — Hamid R Badr
(74) *Attorney, Agent, or Firm* — Kristin J. McNamara

(57) ABSTRACT

The present invention provides processes for production of wort and beer from a granular starch adjunct grist mashed-in at a temperature below the gelatinization temperature of said starch.

18 Claims, No Drawings

MASHING PROCESS

CROSS-REFERENCE TO RELATED APPLICATIONS

This application is a 35 U.S.C. 371 national application of PCT/EP2007/053222 filed Apr. 3, 2007 which claims priority or the benefit under 35 U.S.C. 119 of Danish application no. PA 2006 00483 filed Apr. 4, 2006 and U.S. provisional application No. 60/789,213 filed Apr. 4, 2006, the contents of which are fully incorporated herein by reference.

FIELD OF THE INVENTION

The present invention relates to an improved mashing process using grist comprising ungelatinized adjunct.

BACKGROUND OF THE INVENTION

Traditionally, beer has been brewed from just barley malt, hops and water. However, often part of the barley malt is substituted with adjuncts such as corn, rice, sorghum, and wheat, refined starch or readily fermentable carbohydrates such as sugar or syrups. Adjuncts are used mainly because they are readily available and provide carbohydrates at a lower cost than is available from barley malt. Other advantages may also be achieved, e.g. enhanced physical stability, superior chill-proof qualities, and greater brilliancy.

Mashing is the process of converting starch from the milled barley malt and adjuncts into fermentable and unfermentable sugars to produce wort of the desired composition. Traditional mashing involves mixing milled barley malt and adjuncts with water at a set temperature and volume to continue the biochemical changes initiated during the malting process. The mashing process is conducted over a period of time at various temperatures in order to activate the endogenous enzymes responsible for the degradation of proteins and carbohydrates. However, rice and corn starch which are often used as adjunct starch have a higher gelatinization temperature than the malt starch. Therefore, such adjuncts are cooked and gelatinized in a separate "cereal cooker" before being added to the malt mash. Thus, while the use of adjunct reduces the costs of raw material price it requires an additional investment in the cereal cooker as well as an additional cost for energy for heating the adjunct. A more simple mashing process allowing use of ungelatinized adjunct grist is thus desirable.

SUMMARY OF THE INVENTION

The inventor of the present invention has surprisingly found that an adjunct starch can be added to the malt mash and be efficiently mashed without prior gelatinization. Thus an adjunct such as corn grits, corn starch or rice starch, can be mashed with the malt at temperatures where the endogenous malt enzymes are active. The liquefaction of the ungelatinized adjunct requires that the endogenous malt enzymes are supplemented by an exogenously supplied enzyme composition.

Accordingly in a first aspect the invention provides a process for production of a Brewer's wort, comprising mashing a grist comprising malt and a granular starch adjunct in the presence of an exogenously supplied enzyme composition at a temperature at which the endogenous malt enzymes are active. The invention further provides a process for production of a Brewer's wort, comprising; a) providing a mash comprising i) malt, ii) adjunct comprising granular starch, and iii) an exogenously supplied enzyme composition, b) mashing said mash at a temperature below the initial gelatinisation temperature of said granular starch, c) mashing off at a temperature above the initial gelatinisation temperature, and d) separating the spent grain from the mash and obtaining a wort.

In a second aspect the invention provides a wort produced by the process according to the first and second aspect.

In a third aspect the invention provides a beer produced by fermenting the wort of the third aspect.

DETAILED DESCRIPTION OF THE INVENTION

It is the intention of the present invention to provide a more simple mashing process allowing use of ungelatinized adjunct grist in the process.

DEFINITIONS

Throughout this disclosure, various terms that are generally understood by those of ordinary skill in the arts are used. Several terms are used with specific meaning, however, and are meant as defined by the following.

As used herein the term "grist" is understood as the starch or sugar containing material that is the basis for beer production, e.g. the barley malt and the adjunct.

The term "malt" is understood as any malted cereal grain, in particular barley.

The term "adjunct" is understood as the part of the grist which is not barley malt. The adjunct may be any starch rich plant material such as, but not limited to, corn, rice, sorghum, and wheat. Preferred adjunct for the invention is corn grits.

The term "mash" is understood as a starch containing slurry comprising crushed barley malt, crushed unmalted grain, other starch containing material, or a combination hereof, steeped in water to make wort.

The term "wort" is understood as the unfermented liquor run-off following extracting the grist during mashing.

The term "spent grains" is understood as the drained solids remaining when the grist has been extracted and the wort separated.

The term "beer" is here understood as a fermented wort, i.e. an alcoholic beverage brewed from barley malt, optionally adjunct and hops.

The term "granular starch" is understood as ungelatinized starch, or raw starch.

The term "initial gelatinization temperature" is understood as the lowest temperature at which gelatinization of the starch commences. Starch heated in water begins to gelatinize between 50° C. and 75° C.; the exact temperature of gelatinization depends on the specific starch, and can readily be determined by the skilled person. Thus, the initial gelatinization temperature may vary according to the plant species, to the particular variety of the plant species as well as with the growth conditions. In the context of this invention the initial gelatinization temperature of a given starch is the temperature at which birefringence is lost in 5% of the starch granules using the method described by Gorinstein. S. and Lii. C., Starch/Stärke, Vol. 44 (12) pp. 461-466 (1992). For corn starch the initial gelatinization temperature is approximately 62° C. (midpoint: 67° C., completion: 72° C.), and for rice starch the initial gelatinization temperature is approximately 68° C. (midpoint: 74.5° C., completion: 78° C.) (Starch, 2nd ed. Industrial microscopy of starch by Eileen Maywald Snyder).

The term "extract recovery" in the wort is understood as the sum of soluble substances extracted from the grist (malt and adjuncts) expressed in percentage based on dry matter.

The term "identity" when used about polypeptide or DNA sequences and referred to in this disclosure is understood as the degree of identity between two sequences indicating a derivation of the first sequence from the second. The identity may suitably be determined by means of computer programs known in the art such as GAP provided in the GCG program package (Program Manual for the Wisconsin Package, Version 8, August 1994, Genetics Computer Group, 575 Science Drive, Madison, Wis., USA 53711) (Needleman, S. B. and Wunsch, C. D., (1970), Journal of Molecular Biology, 48, 443-453. The following settings for polypeptide sequence comparison are used: GAP creation penalty of 3.0 and GAP extension penalty of 0.1.

In a first aspect the invention a process for production of a Brewer's wort is provided. The process comprises mashing a grist comprising malt and a granular starch adjunct in the presence of an exogenously supplied enzyme composition at a temperature at which the endogenous malt enzymes are active. The invention further provides a process for production of a Brewer's wort, comprising; a) providing a mash comprising i) malt, ii) adjunct comprising granular starch, and iii) an exogenously supplied enzyme composition, b) mashing said mash at a temperature below the initial gelatinisation temperature of said granular starch, c) mashing off at a temperature above the initial gelatinisation temperature, and d) separating the spent grain from the mash and obtaining a wort.

In accordance with the first aspect of the present invention a grist comprising malt and a granular starch adjunct is mashed in the presence of an exogenously supplied enzyme composition at a temperature at which the endogenous malt enzymes e.g. alpha-amylases, proteases and beta-amylases, that the traditional mashing processes rely on, are active.

The water may preferably, before being added to the grist, be preheated in order for the mash to attain the desired mash temperature at the moment of mash forming. If the temperature of the formed mash is below the desired mashing temperature additional heat is preferably supplied in order to attain the desired process temperature. Preferably, the desired mashing temperature is attained within 15 minutes, or more preferably within 10 minutes, such as within 9, 8, 7, 6, 5, 4, 3, 2 minutes or even more preferably within 1 minute after the mash forming, or most preferably the desired mashing temperature is attained at the mash forming. The temperature profile of the mashing process may be a profile from a conventional mashing process wherein the temperatures are set to achieve optimal degradation of the grist dry matter by the malt enzymes.

The malt is preferably derived from one or more of the grains selected from the list consisting of corn, barley, wheat, rye, sorghum, millet and rice. Preferably, the malt is barley malt.

The grist preferably comprises from 0.5% to 99%, preferably from 1% to 95%, more preferably from 5% to 90%, even more preferably from 10% to 80%, and most preferably from 50% to 70% malted grain.

In addition to malted grain, the grist may preferably comprise adjunct such as unmalted corn, or other unmalted grain, such as barley, wheat, rye, oat, corn, rice, milo, millet and/or sorghum, or raw and/or refined starch and/or sugar containing material derived from plants like wheat, rye, oat, corn, rice, milo, millet, sorghum, potato, sweet potato, cassava, tapioca, sago, banana, sugar beet and/or sugar cane. For the invention adjuncts may be obtained from tubers, roots, stems, leaves, legumes, cereals and/or whole grain. Preferred is adjunct obtained from corn and/or rice, more preferred the adjunct is rice starch, corn starch and/or corn grits. The mash preferably comprises from 1% to 50%, preferably from 5% to 45%, more preferably from 10% to 40%, and even more preferably from 20 to 35% adjunct starch. Adjunct comprising readily fermentable carbohydrates such as sugars or syrups may be added to the malt mash before, during or after the mashing process of the invention but is preferably added after the mashing process.

Prior to forming the mash the malt and/or adjunct is preferably milled and most preferably dry or wet milled.

According to the invention an enzyme composition is exogenously supplied and may be added to the mash ingredients, e.g. the water or the grist before during or after forming the mash. In a particularly preferred embodiment the enzyme composition comprises an alpha-amylase (EC 3.2.1.1) and/or a glucoamylase (EC 3.2.1.3). The alpha-amylase is preferably a bacterial alpha-amylase or and/or a fungal alpha-amylase, e.g., an acid fungal alpha-amylase. The glucoamylase is preferably a fungal glucoamylase.

By selecting the enzymes making up the enzyme composition the sugar profile of the resulting wort can be controlled. An enzyme composition comprising alpha-amylase, preferably a bacterial alpha-amylase, and little or no glucoamylase will result in a maltose rich wort similar to an all malt wort. An enzyme composition comprising glucoamylase will result in a glucose rich wort.

In yet a preferred embodiment a further enzyme is added, said enzyme being selected from the group consisting of a cellulase, a pullulanase, a protease, a maltose generating enzyme, a laccase, a lipase, a phospholipolase, a phytase, a phytin esterase, and a xylanase.

During the mashing process, starch extracted from the grist is gradually hydrolyzed into fermentable sugars and smaller dextrins. Preferably the mash is starch negative to iodine testing, before extracting the wort.

The mashing is finalized by mashing-off at temperature of 70° C. or more, preferably at least 71° C., at least 72° C., at least 73° C., at least 74° C., at least 75° C., at least 76° C. at least 77° C., at least 78° C., least 79° C., at least 80° C. and more preferably at least 81° C. or even at least 82° C. or more.

Obtaining the wort from the mash typically includes straining the wort from the spent grains, i.e. the insoluble grain and husk material forming part of grist. Hot water may be run through the spent grains to rinse out, or sparge, any remaining extract from the grist. Preferably, the extract recovery is at least 80%, preferably at least 85%, at least 90%, least 95%, at least 98% and more preferably at least 99% or even at least 100%. The wort may be used as it is, or it may be concentrated and/or dried.

In a preferred embodiment a grist comprising 60-80% barley malt and 20% to 40% corn starch and/or corn grits and/or rice starch is mashed in the presence of an alpha-amylase. Preferably, the alpha-amylase AMY1 or AMY2 described below is used in amount of approximately 2 KNU/g DM, preferably in amount of 0.05 to 10 KNU/g DM, more preferable 0.1 to 8 KNU/g DM, even more preferable 0.5 to 5 KNU/g DM. Preferably, the starch is mashed using a temperature profile preferably starting at approximately 52° C., increasing to at approximately 64° C., and mashing off preferably at approximately 78° C. or more.

A second aspect of the invention is a wort produced by the method described above. In addition to the second aspect of the invention the wort produced by the process of the first aspect of the invention may be fermented to produce an alcoholic beverage, preferably a beer. Fermentation of the wort may include pitching the wort with a yeast slurry comprising fresh yeast, i.e. yeast not previously used for the invention or the yeast may be recycled yeast. The yeast applied may be any yeast suitable for beer brewing, especially yeasts selected from *Saccharomyces* spp. such as *S. cerevisiae* and *S. uvarum*, including natural or artificially produced variants of these organisms. The methods for fermentation of wort for production of beer are well known to the person skilled in the arts.

The processes of the invention may include adding silica hydrogel to the fermented wort to increase the colloidal stability of the beer. The processes may further include adding kieselguhr to the fermented wort and filtering to render the beer bright.

A third aspect of the invention is a beer produced by the processes of the invention, such a beer may be any type of beer. Preferred beer types comprise ales, strong ales, stouts, porters, lagers, bitters, export beers, malt liquors, happoushu, high-alcohol beer, low-alcohol beer, low-calorie beer or light beer.

Enzymes

The exogenous enzymes to be applied in the present invention should be selected for their ability to retain sufficient activity at the process temperature of the processes of the invention, as well as for their ability to retain sufficient activity under the moderately acid pH regime in the mash and should be added in effective amounts. The enzymes may be derived from any source, preferably from a plant or an algae, and more preferably from a microorganism, such as from a bacteria or a fungi.

Alpha-Amylase (EC 3.2.1.1)

A particular alpha-amylase enzyme to be used in the processes of the invention may be a *Bacillus* alpha-amylase, e.g., an alpha-amylase derived from a strain of *B. licheniformis, B. amyloliquefaciens*, and *B. stearothermophilus*. A preferred bacterial alpha-amylase is a recombinant *B. stearothermophilus* alpha-amylase variant with the mutations; I181*+G182*+N193F. The variant is shown in SEQ ID NO:2 (AMY1). Also preferred are alpha-amylases having an amino acid sequence with least 50% such as at least 60%, at least 70%, at least 80%, at least 85%, at least 90%, at least 95%, at least 98%, or particularly at least 99% identity to the amino acid sequence shown in SEQ ID NO:2.

Even more preferred for the invention is a bacterial alpha-amylase comprising a starch binding module, preferably a starch binding module of family 20. Such an alpha-amylase may be derived from *Bacillus flavothermus* (syn. *Anoxybacillus contaminans*). Most preferred is an alpha-amylase having at least 50% such as at least 60%, at least 70%, at least 80%, at least 85%, at least 90%, at least 95%, at least 98%, or particularly at least 99% identity to the amino acid sequence shown in SEQ ID NO:1 (AMY2).

*Bacillus* alpha-amylases may be added in the amounts of 1.0-1000 NU/kg dm, preferably from 2.0-500 NU/kg dm, preferably 10-200 NU/kg dm.

Another particular alpha-amylase to be used in the processes of the invention may be any fungal alpha-amylase. Particularly preferred are acid fungal alpha-amylases. Especially contemplated are fungal alpha-amylases which exhibit a high identity, i.e. at least 50%, at least 55%, at least 60%, at least 65%, at least 70%, at least 75%, at least 80%, at least 85% or even at least 90% identity to the amino acid sequence shown in SEQ ID NO:10 in WO96/23874.

Fungal alpha-amylases may be added in an amount of 1-1000 AFAU/kg DM, preferably from 2-500 AFAU/kg DM, preferably 20-100 AFAU/kg DM.

Glucoamylases

A further particular enzyme to be used in the processes of the invention may be a glucoamylase (E.C.3.2.1.3) derived from a microorganism or a plant. Preferred are glucoamylases of fungal or bacterial origin selected from the group consisting of *Aspergillus* glucoamylases, in particular *A. niger* G1 or G2 glucoamylase (Boel et al. (1984), EMBO J. 3 (5), p. 1097-1102), or variants thereof, such as disclosed in WO92/00381 and WO00/04136; the *A. awamori* glucoamylase (WO84/02921), *A. oryzae* (Agric. Biol. Chem. (1991), 55 (4), p. 941-949), or variants or fragments thereof.

Other contemplated *Aspergillus* glucoamylase variants include variants to enhance the thermal stability: G137A and G139A (Chen et al. (1996), *Prot. Engng.* 9, 499-505); D257E and D293E/Q (Chen et al. (1995), *Prot. Engng.* 8, 575-582); N182 (Chen et al. (1994), *Biochem. J.* 301, 275-281); disulphide bonds, A246C (Fierobe et al. (1996), *Biochemistry*, 35, 8698-8704; and introduction of Pro residues in position A435 and S436 (Li et al. (1997), Protein *Engng.* 10, 1199-1204). Other contemplated glucoamylases include *Talaromyces* glucoamylases, in particular derived from *Talaromyces emersonii* (WO99/28448), *Talaromyces leycettanus* (U.S. Pat. No. Re. 32,153), *Talaromyces duponti, Talaromyces thermophilus* (U.S. Pat. No. 4,587,215). Bacterial glucoamylases contemplated include glucoamylases from the genus *Clostridium*, in particular *C. thermoamylolyticum* (EP 135, 138), and *C. thermohydrosulfuricum* (WO86/01831). Preferred glucoamylases include the glucoamylases derived from *Aspergillus oryzae*, such as a glucoamylase having at least 90%, at least 92%, at least 95%, at least 96%, at least 97%, at least 98%, or particularly at least 99%. even at least 90% identity to the amino acid sequence shown in SEQ ID NO:2 in WO00/04136. Also contemplated are the commercial products AMG 200L; AMG 300 L; SAN™ SUPER and AMG™ E (from Novozymes); OPTIDEX™ 300 (from Genencor Int.); AMIGASE™ and AMIGASE™ PLUS (from DSM); G-ZYME™ G900 (from Enzyme Bio-Systems); G-ZYME™ G990 ZR (*A. niger* glucoamylase and low protease content). Glucoamylases may be added in effective amounts well known to the person skilled in the art.

Cellulase (E.C. 3.2.1.4)

The cellulase may be of microbial origin, such as derivable from a strain of a filamentous fungus (e.g., *Aspergillus, Trichoderma, Humicola, Fusarium*). Specific examples of cellulases include the endo-glucanase (endo-glucanase I) obtainable from *H. insolens* and further defined by the amino acid sequence of FIG. 14 in WO 91/17244 and the 43 kD *H. insolens* endo-glucanase described in WO 91/17243.

A particular cellulase to be used in the processes of the invention may be an endo-glucanase, such as an endo-1,4-beta-glucanase. Contemplated are beta-glucanases having at least 90% identity to amino acid sequence disclosed as SEQ ID NO:1 in WO 2003/062409 such as at least 92%, at least 95%, at least 96%, at least 97%, at least 98%, or particularly at least 99%.

Commercially available cellulase preparations which may be used include CELLUCLAST®, CELLUZYME®, CEREFLO® and ULTRAFLO® (available from Novozymes A/S), LAMINEX™ and SPEZYME® CP (available from Genencor Int.) and ROHAMENT® 7069 W (available from Röhm, Germany).

Beta-glucanases may be added in the amounts of 1.0-10000 BGU/kg dm, preferably from 10-5000 BGU/kg dm, preferably from 50-1000 BGU/kg dm and most preferably from 100-500 BGU/kg dm.

Debranching Enzymes

Another enzyme applied in the process of the invention may be a debranching enzyme, such as an isoamylase (E.C. 3.2.1.68) or a pullulanases (E.C. 3.2.1.41). Isoamylase hydrolyses alpha-1,6-D-glucosidic branch linkages in amylopectin and beta-limit dextrins and can be distinguished from pullulanases by the inability of isoamylase to attack pullulan, and by the limited action on alpha-limit dextrins. Debranching enzyme may be added in effective amounts well known to the person skilled in the art.

Protease

Suitable proteases include microbial proteases, such as fungal and bacterial proteases. Preferred proteases are acidic proteases, i.e., proteases characterized by the ability to hydrolyze proteins under acidic conditions below pH 7.

Contemplated acid fungal proteases include fungal proteases derived from *Aspergillus, Mucor, Rhizopus, Candida, Coriolus, Endothia, Enthomophtra, Irpex, Penicillium, Sclerotium* and *Torulopsis*. Especially contemplated are proteases derived from *Aspergillus niger* (see, e.g., Koaze et al., (1964), Agr. Biol. Chem. Japan, 28, 216), *Aspergillus saitoi* (see, e.g., Yoshida, (1954) J. Agr. Chem. Soc. Japan, 28, 66), *Aspergillus awamori* (Hayashida et al., (1977) Agric. Biol. Chem., 42(5), 927-933, *Aspergillus aculeatus* (WO 95/02044), or *Aspergillus oryzae*, such as the pepA protease; and acidic proteases from *Mucor pusillus* or *Mucor miehei*.

Contemplated are also neutral or alkaline proteases, such as a protease derived from a strain of *Bacillus*. A particular protease contemplated for the invention is derived from *Bacillus amyloliquefaciens* and has the sequence obtainable at Swissprot as Accession No. P06832 as well as proteases having at least 90% identity to said amino acid sequence, such as at least 92%, at least 95%, at least 96%, at least 97%, at least 98%, or particularly at least 99%.

Further contemplated are the proteases having at least 90% identity to amino acid sequence disclosed as SEQ ID NO:1 in the Danish patent applications PA 2001 01821 and PA 2002 00005, such as at 92%, at least 95%, at least 96%, at least 97%, at least 98%, or particularly at least 99%.

Also contemplated are papain-like proteases such as proteases within E.C. 3.4.22.* (cysteine protease), such as EC 3.4.22.2 (papain), EC 3.4.22.6 (chymopapain), EC 3.4.22.7 (asclepain), EC 3.4.22.14 (actinidain), EC 3.4.22.15 (cathepsin L), EC 3.4.22.25 (glycyl endopeptidase) and EC 3.4.22.30 (caricain).

The proteases are responsible for reducing the overall length of high-molecular-weight proteins to low-molecular-weight proteins in the mash. The low-molecular-weight proteins are a necessity for yeast nutrition and the high-molecular-weight-proteins ensure foam stability. Thus it is well-known to the skilled person that protease should be added in a balanced amount which at the same time allows amble free amino acids for the yeast and leaves enough high-molecular-weight-proteins to stabilize the foam. Proteases may be added in the amounts of 0.1-1000 AU/kg dm, preferably 1-100 AU/kg dm and most preferably 5-25 AU/kg dm.

Materials and Methods

Enzymes

AMY1: An *B. stearothermophilus* alpha-amylase variant having the amino acid sequence shown in SEQ ID NO:4 in WO99/19467 with the mutations; I181*+G182*+N193F.

AMY2: An *Anoxybacillus contaminans* alpha-amylase having the amino acid sequence shown in SEQ ID NO:1.

Methods

Proteolytic Activity (AU)

The proteolytic activity may be determined with denatured hemoglobin as substrate. In the Anson-Hemoglobin method for the determination of proteolytic activity denatured hemoglobin is digested, and the undigested hemoglobin is precipitated with trichloroacetic acid (TCA). The amount of TCA soluble product is determined with phenol reagent, which gives a blue color with tyrosine and tryptophan.

One Anson Unit (AU) is defined as the amount of enzyme which under standard conditions (i.e. 25° C., pH 7.5 and 10 min. reaction time) digests hemoglobin at an initial rate such that there is liberated per minute an amount of TCA soluble product which gives the same color with phenol reagent as one milliequivalent of tyrosine.

A folder AF 4/5 describing the analytical method in more detail is available upon request to Novo Nordisk A/S, Denmark, which folder is hereby included by reference.

Alpha-Amylase Activity (NU)

The amylolytic activity may be determined using potato starch as substrate. This method is based on the break-down of modified potato starch by the enzyme, and the reaction is followed by mixing samples of the starch/enzyme solution with an iodine solution. Initially, a blackish-blue color is formed, but during the break-down of the starch the blue color gets weaker and gradually turns into a reddish-brown, which is compared to a colored glass standard.

One Kilo Novo alpha amylase Unit (KNU) equals 1000 NU. One KNU is defined as the amount of enzyme which, under standard conditions (i.e. at 37° C.+/−0.05; 0.0003 M Ca2+; and pH 5.6) dextrinizes 5.26 g starch dry substance Merck Amylum solubile.

A folder AF 9/6 describing this analytical method in more detail is available upon request to Novozymes A/S, Denmark, which folder is hereby included by reference.

Glucoamylase Activity (AGU)

The Novo Glucoamylase Unit (AGU) is defined as the amount of enzyme, which hydrolyzes 1 micromole maltose per minute at 37° C. and pH 4.3.

The activity is determined as AGU/ml by a method modified after (AEL-SM-0131, available on request from Novozymes) using the Glucose GOD-Perid kit from Boehringer Mannheim, 124036. Standard: AMG-standard, batch 7-1195, 195 AGU/ml. 375 microL substrate (1% maltose in 50 mM Sodium acetate, pH 4.3) is incubated 5 minutes at 37° C. 25 microL enzyme diluted in sodium acetate is added. The reaction is stopped after 10 minutes by adding 100 microL 0.25 M NaOH. 20 microL is transferred to a 96 well microtitre plate and 200 microL GOD-Perid solution (124036, Boehringer Mannheim) is added. After 30 minutes at room temperature, the absorbance is measured at 650 nm and the activity calculated in AGU/ml from the AMG-standard. A detailed description of the analytical method (AEL-SM-0131) is available on request from Novozymes.

Beta-Glucanase Activity (BGU)

The cellulytic activity may be measured in beta-glucanase units (BGU). Beta-glucanase reacts with beta-glucan to form glucose or reducing carbohydrate which is determined as reducing sugar using the Somogyi-Nelson method. 1 beta-glucanase unit (BGU) is the amount of enzyme which, under standard conditions, releases glucose or reducing carbohydrate with a reduction capacity equivalent to 1 μmol glucose per minute. Standard conditions are 0.5% beta-glucan as substrate at pH 7.5 and 30° C. for a reaction time of 30 minutes.

A detailed description of the analytical method (EB-SM-0070.02/01) is available on request from Novozymes A/S.

Standard Congress Mashing Process

The standard Congress mashing process was performed according to the procedure of EBC: 4.5.1 Extract of Malt: Congress Mash. The temperature profile consisted of initial mashing temperature of 45° C. for 30 minutes, increasing to 70° C. with 1.0° C./min for 25 minutes, finalized by 70° C. for 65 minutes giving a total mashing period of 2 hours.

Additional Methods

Methods for analysis of raw products, wort, beer etc. can be found in *Analytica-EBC*, Analysis Committee of EBC, the European Brewing Convention (1998), Verlag Hans Carl Geranke-Fachverlag. For the present invention the methods applied for determination of the following parameters were:

Plato: refractometer.

Assimilable N: Based on EBC: 8.10 but with TNBS (2,4,6 trinitrobenzen sulphonic acid) as reagent instead of ninhydrin. TNBS reacts in a solution of free amino groups or amino acids and peptides, which creates a yellow complex, which is measured spectrophotometric at 340 nm.

Beta-glucan: EBC: 8.13.2 (High Molecular weight beta-glucan content of wort: Fluorimetric Method).

Color: EBC: 4.7.2

Modification EBC: 4.14 Modification and Homogenity of malt, Calcoflour method

Filterability: Volume of filtrate (ml) determination: According to EBC: 4.5.1 (Extract of Malt: Congress Mash) subsection 8.2. Filtration: Filtration volume is read after 1 hour of filtration through fluted filter paper, 320 mm diameter, Schleicher and Schüll No. 597½, Machery, Nagel and Co. in funnels, 200 mm diameter, fitted in 500 ml flasks.

pH: EBC: 8.17 (pH of Wort).

Kolbach Index: EBC: 4.9.1 (Soluble Nitrogen of Malt: Spectrophotometric Method) and EBC: 3.3.1 (Total Nitrogen of Barley: Kjeldahl Method (RM)).

Extract recovery: EBC: 4.5.1 (Extract of Malt: Congress Mash, Extract in dry, yield). The term extract recovery in the wort is defined as the sum of soluble substances (glucose, sucrose, maltose, maltotriose, dextrins, protein, gums, inorganic, other substances) extracted from the grist (malt and adjuncts) expressed in percentage based on dry matter. The remaining insoluble part is defined as spent grains.

$$a)\ E_1 = \frac{P(M + 800)}{100 - P}$$

$$b)\ E_2 = \frac{E_1 \cdot 100}{100 - M}$$

where;

$E_1$=the extract content of sample, in % (m/m)
$E_2$=the extract content of dry grist, in % (m/m)
P=the extract content in wort, in % Plato
M=the moisture content of the grist, in % (m/m)
800=the amount of destilled water added into the mash to 100 g of grist Mash Preparation Unless otherwise stated mashing was performed as follows. The mash was prepared according to EBC: 4.5.1 using malt grounded according to EBC: 1.1. Mashing trials were performed in 500 ml lidded vessels each containing a mash with 50 g grist and adjusted to a total weight of 250±0.2 g with water preheated to the initial mashing temperature +1° C. During mashing the vessels were incubated in water bath with stirring. After mashing and before filtration water was added to each vessel to a total of 300 g. After filtration the wort was boiled for 10 minute and diluted 1:1 with water. To portions of 200 g wort was added 1.2 g yeast and fermentation was performed for 4 days.

EXAMPLES

Example 1

A grist comprising 65% well modified malt and 35% corn starch was mashed in the presence of an alpha-amylase using the mashing temperature profile consisting of 34 min at 52° C., increase by 1° C./min for 18 min, 60° C. for 60 min, increase by 1° C./min for 18 min, 78° C. for 20 min followed by cooling to 20° C. The wort and young beer was analyzed by HPLC. Results are shown in table 1.

TABLE 1

Corn starch: Sugar profile, Plato and yield of diluted wort, alcohol of young beer.

| | Enzyme dosage KNU/g DM | DP1 g/l | DP2 g/l | DP3 g/l | Ferment. sugar g/l | DP3+ g/l | Plato | Yield % | Alcohol w/w |
|---|---|---|---|---|---|---|---|---|---|
| — | 0.00 | 9.91 | 26.39 | 11.57 | 47.87 | 28.70 | 7.47 | 88.85 | 2.17 |
| AMY1 | 0.50 | 10.21 | 29.34 | 15.26 | 53.81 | 25.99 | 7.79 | 93.29 | 2.44 |
| AMY1 | 0.75 | 10.05 | 28.83 | 14.29 | 53.17 | 24.21 | 7.57 | 90.30 | 2.46 |
| AMY1 | 1.00 | 10.26 | 29.31 | 14.72 | 54.28 | 23.55 | 7.60 | 90.68 | 2.51 |
| AMY1 | 1.50 | 10.65 | 30.26 | 15.39 | 56.29 | 22.82 | 7.72 | 92.31 | 2.59 |
| AMY1 | 2.00 | 10.71 | 30.33 | 15.74 | 56.78 | 22.00 | 7.71 | 92.28 | 2.61 |
| AMY2 | 0.50 | 9.72 | 35.42 | 15.94 | 61.08 | 21.40 | 8.02 | 96.65 | 2.79 |
| AMY2 | 0.75 | 9.21 | 35.32 | 15.82 | 60.35 | 18.56 | 7.72 | 92.38 | 2.78 |
| AMY2 | 1.00 | 8.97 | 34.51 | 15.74 | 59.22 | 17.33 | 7.49 | 89.16 | 2.61 |
| AMY2 | 1.50 | 9.14 | 36.11 | 16.76 | 62.01 | 16.66 | 7.70 | 92.10 | 2.85 |
| AMY2 | 2.00 | 9.31 | 37.53 | 17.45 | 64.29 | 15.81 | 7.86 | 94.30 | 2.96 |

Example 2

A grist comprising 65% well modified malt and 35% rice starch was mashed in the presence of an alpha-amylase using the mashing temperature profile consisting of 34 min at 52° C., increase by 1° C./min for 18 min, 64° C. for 60 min, increase by 1° C./min for 18 min, 78° C. for 20 min followed by cooling to 20° C. The wort and young beer was analyzed by HPLC. Results are shown in table 2.

TABLE 2

Rice starch: Sugar profile, Plato and yield of diluted wort, alcohol of young beer.

|  | Enzyme dosage KNU g/DM | DP1 g/l | DP2 g/l | DP3 g/l | Ferment. sugar g/l | DP3+ g/l | Plato | Yield % | Alcohol w/w | RDF | RDF |
|---|---|---|---|---|---|---|---|---|---|---|---|
| — | 0.00 | 15.50 | 28.41 | 13.41 | 57.32 | 14.63 | 7.25 | 86.11 | 2.57 | 82.8 | 67.2 |
| AMY1 | 0.50 | 14.70 | 26.99 | 13.79 | 55.48 | 12.87 | 7.52 | 89.87 | 2.70 | 83.9 | 68.1 |
| AMY1 | 0.75 | 15.37 | 28.25 | 14.60 | 58.22 | 12.79 | 7.22 | 85.77 | 2.54 | 84.4 | 68.6 |
| AMY1 | 1.00 | 14.33 | 26.65 | 13.94 | 54.93 | 11.69 | 7.31 | 86.94 | 2.56 | 84.9 | 68.9 |
| AMY1 | 1.50 | 14.32 | 26.33 | 13.99 | 54.64 | 11.08 | 7.32 | 87.14 | 2.56 | 85.2 | 69.2 |
| AMY1 | 2.00 | 14.46 | 26.39 | 14.34 | 55.18 | 11.22 | 7.41 | 88.38 | 2.60 | 85.4 | 69.4 |
| AMY2 | 0.50 | 14.23 | 28.36 | 14.61 | 57.20 | 11.01 | 7.61 | 91.22 | 2.70 | 86.1 | 69.9 |
| AMY2 | 0.75 | 14.41 | 28.69 | 15.05 | 58.15 | 10.55 | 7.49 | 89.52 | 2.62 | 86.2 | 70.0 |
| AMY2 | 1.00 | 14.16 | 28.67 | 15.13 | 57.96 | 9.94 | 7.34 | 87.38 | 2.60 | 87.0 | 70.6 |
| AMY2 | 1.50 | 14.53 | 29.60 | 15.78 | 59.91 | 9.53 | 7.72 | 92.72 | 2.76 | 88.1 | 71.5 |
| AMY2 | 2.00 | 14.76 | 29.77 | 16.12 | 60.65 | 9.51 | 7.55 | 90.32 | 2.70 | 87.3 | 70.8 |

The invention claimed is:

1. A process for production of a brewer's wort, comprising;
   a) providing a grist comprising malt and an un-gelatinized starch adjunct obtained from corn, rice, sorghum or millet, and
   b) mashing, without prior gelatinization of the starch adjunct, the grist in the presence of an exogenously supplied alpha-amylase at a temperature below the initial gelatinization temperature of said un-gelatinized starch adjunct,
   c) mashing off at a temperature above the initial gelatinization temperature,
   d) separating the spent grain from the mash to obtain the wort; and wherein the adjunct is not cooked and gelatinized in a separate cereal cooker.

2. The process of claim 1, wherein the adjunct comprises corn starch or rice starch.

3. The process of claim 1, wherein the grist of the mash comprises 60-80% barley malt.

4. The process of claim 1, wherein the grist of the mash comprises from 10% to 40% adjunct starch.

5. The process of claim 1, wherein the alpha-amylase is a bacterial alpha-amylase.

6. The process of claim 1, wherein the bacterial alpha-amylase comprises a starch binding module.

7. The process of claim 1, wherein the alpha-amylase is a polypeptide having at least 50% identity to the amino acid sequence shown in SEQ ID NO:1.

8. The process of claim 1, wherein the alpha-amylase is a polypeptide having at least 50% identity to the amino acid sequence shown in SEQ ID NO:2.

9. The process of claim 7 or 8 wherein the alpha-amylase is used in an amount of 0.5 to 5 KNU/g dry matter.

10. A process for production of beer, comprising producing a brewer's wort by the process of claim 1 and fermenting the wort.

11. The process of claim 1, wherein the alpha-amylase is a polypeptide having at least 90% identity to the amino acid sequence shown in SEQ ID NO:1.

12. The process of claim 1, wherein the alpha-amylase is a polypeptide having at least 90% identity to the amino acid sequence shown in SEQ ID NO:2.

13. The process of claim 1, wherein the alpha-amylase is a polypeptide having at least 95% identity to the amino acid sequence shown in SEQ ID NO:1.

14. The process of claim 1, wherein the alpha-amylase is a polypeptide having at least 95% identity to the amino acid sequence shown in SEQ ID NO:2.

15. The process of claim 1, wherein the alpha-amylase is a polypeptide having at least 98% identity to the amino acid sequence shown in SEQ ID NO:1.

16. The process of claim 1, wherein the alpha-amylase is a polypeptide having at least 98% identity to the amino acid sequence shown in SEQ ID NO:2.

17. The process of claim 1, wherein the alpha-amylase is a polypeptide having at least 99% identity to the amino acid sequence shown in SEQ ID NO:1.

18. The process of claim 1, wherein the alpha-amylase is a polypeptide having at least 99% identity to the amino acid sequence shown in SEQ ID NO:2.

* * * * *

SEQUENCE LISTING

<160> NUMBER OF SEQ ID NOS: 2

<210> SEQ ID NO 1
<211> LENGTH: 619
<212> TYPE: PRT
<213> ORGANISM: Anoxybacillus contaminans
<220> FEATURE:
<221> NAME/KEY: SIGNAL
<222> LOCATION: (1)..(31)
<220> FEATURE:
<221> NAME/KEY: mat_peptide
<222> LOCATION: (32)..(619)

<400> SEQUENCE: 1

```
Met Ser Leu Phe Lys Lys Ser Phe Pro Trp Ile Leu Ser Leu Leu Leu
    -30                 -25                 -20

Leu Phe Ser Phe Ile Ala Pro Phe Ser Ile Gln Thr Glu Lys Val Arg
-15                 -10                  -5                  -1  1

Ala Gly Ser Val Pro Val Asn Gly Thr Met Met Gln Tyr Phe Glu Trp
                 5                  10                  15

Tyr Leu Pro Asp Asp Gly Thr Leu Trp Thr Lys Val Ala Asn Asn Ala
            20                  25                  30

Gln Ser Leu Ala Asn Leu Gly Ile Thr Ala Leu Trp Leu Pro Pro Ala
    35                  40                  45

Tyr Lys Gly Thr Ser Ser Ser Asp Val Gly Tyr Gly Val Tyr Asp Leu
50                  55                  60                  65

Tyr Asp Leu Gly Glu Phe Asn Gln Lys Gly Thr Val Arg Thr Lys Tyr
                70                  75                  80

Gly Thr Lys Thr Gln Tyr Ile Gln Ala Ile Gln Ala Ala His Thr Ala
            85                  90                  95

Gly Met Gln Val Tyr Ala Asp Val Val Phe Asn His Lys Ala Gly Ala
        100                 105                 110

Asp Gly Thr Glu Leu Val Asp Ala Val Glu Val Asn Pro Ser Asp Arg
    115                 120                 125

Asn Gln Glu Ile Ser Gly Thr Tyr Gln Ile Gln Ala Trp Thr Lys Phe
130                 135                 140                 145

Asp Phe Pro Gly Arg Gly Asn Thr Tyr Ser Ser Phe Lys Trp Arg Trp
                150                 155                 160
```

-continued

Tyr His Phe Asp Gly Thr Asp Trp Asp Glu Ser Arg Lys Leu Asn Arg
            165                 170                 175

Ile Tyr Lys Phe Arg Gly Thr Gly Lys Ala Trp Asp Trp Glu Val Asp
            180                 185                 190

Thr Glu Asn Gly Asn Tyr Asp Tyr Leu Met Tyr Ala Asp Leu Asp Met
195                 200                 205

Asp His Pro Glu Val Val Ser Glu Leu Lys Asn Trp Gly Lys Trp Tyr
210                 215                 220                 225

Val Thr Thr Thr Asn Ile Asp Gly Phe Arg Leu Asp Ala Val Lys His
                230                 235                 240

Ile Lys Tyr Ser Phe Phe Pro Asp Trp Leu Ser Tyr Val Arg Thr Gln
            245                 250                 255

Thr Gln Lys Pro Leu Phe Ala Val Gly Glu Phe Trp Ser Tyr Asp Ile
            260                 265                 270

Ser Lys Leu His Asn Tyr Ile Thr Lys Thr Asn Gly Ser Met Ser Leu
            275                 280                 285

Phe Asp Ala Pro Leu His Asn Asn Phe Tyr Ile Ala Ser Lys Ser Gly
290                 295                 300                 305

Gly Tyr Phe Asp Met Arg Thr Leu Leu Asn Asn Thr Leu Met Lys Asp
                310                 315                 320

Gln Pro Thr Leu Ala Val Thr Leu Val Asp Asn His Asp Thr Glu Pro
            325                 330                 335

Gly Gln Ser Leu Gln Ser Trp Val Glu Pro Trp Phe Lys Pro Leu Ala
            340                 345                 350

Tyr Ala Phe Ile Leu Thr Arg Gln Glu Gly Tyr Pro Cys Val Phe Tyr
            355                 360                 365

Gly Asp Tyr Tyr Gly Ile Pro Lys Tyr Asn Ile Pro Ala Leu Lys Ser
370                 375                 380                 385

Lys Leu Asp Pro Leu Leu Ile Ala Arg Arg Asp Tyr Ala Tyr Gly Thr
                390                 395                 400

Gln His Asp Tyr Ile Asp Ser Ala Asp Ile Ile Gly Trp Thr Arg Glu
            405                 410                 415

Gly Val Ala Glu Lys Ala Asn Ser Gly Leu Ala Ala Leu Ile Thr Asp
            420                 425                 430

Gly Pro Gly Gly Ser Lys Trp Met Tyr Val Gly Lys Gln His Ala Gly
435                 440                 445

Lys Thr Phe Tyr Asp Leu Thr Gly Asn Arg Ser Asp Thr Val Thr Ile
450                 455                 460                 465

Asn Ala Asp Gly Trp Gly Glu Phe Lys Val Asn Gly Gly Ser Val Ser
                470                 475                 480

Ile Trp Val Pro Lys Ile Ser Thr Thr Ser Gln Ile Thr Phe Thr Val
            485                 490                 495

Asn Asn Ala Thr Thr Val Trp Gly Gln Asn Val Tyr Val Val Gly Asn
            500                 505                 510

Ile Ser Gln Leu Gly Asn Trp Asp Pro Val His Ala Val Gln Met Thr
            515                 520                 525

Pro Ser Ser Tyr Pro Thr Trp Thr Val Thr Ile Pro Leu Leu Gln Gly
530                 535                 540                 545

Gln Asn Ile Gln Phe Lys Phe Ile Lys Lys Asp Ser Ala Gly Asn Val
                550                 555                 560

Ile Trp Glu Asp Ile Ser Asn Arg Thr Tyr Thr Val Pro Thr Ala Ala
            565                 570                 575

```
Ser Gly Ala Tyr Thr Ala Ser Trp Asn Val Pro
        580                 585

<210> SEQ ID NO 2
<211> LENGTH: 513
<212> TYPE: PRT
<213> ORGANISM: Bacillus stearothermophilus

<400> SEQUENCE: 2

Ala Ala Pro Phe Asn Gly Thr Met Met Gln Tyr Phe Glu Trp Tyr Leu
1               5                   10                  15

Pro Asp Asp Gly Thr Leu Trp Thr Lys Val Ala Asn Glu Ala Asn Asn
            20                  25                  30

Leu Ser Ser Leu Gly Ile Thr Ala Leu Trp Leu Pro Pro Ala Tyr Lys
        35                  40                  45

Gly Thr Ser Arg Ser Asp Val Gly Tyr Gly Val Tyr Asp Leu Tyr Asp
    50                  55                  60

Leu Gly Glu Phe Asn Gln Lys Gly Thr Val Arg Thr Lys Tyr Gly Thr
65                  70                  75                  80

Lys Ala Gln Tyr Leu Gln Ala Ile Gln Ala Ala His Ala Ala Gly Met
                85                  90                  95

Gln Val Tyr Ala Asp Val Val Phe Asp His Lys Gly Gly Ala Asp Gly
            100                 105                 110

Thr Glu Trp Val Asp Ala Val Glu Val Asn Pro Ser Asp Arg Asn Gln
        115                 120                 125

Glu Ile Ser Gly Thr Tyr Gln Ile Gln Ala Trp Thr Lys Phe Asp Phe
    130                 135                 140

Pro Gly Arg Gly Asn Thr Tyr Ser Ser Phe Lys Trp Arg Trp Tyr His
145                 150                 155                 160

Phe Asp Gly Val Asp Trp Asp Glu Ser Arg Lys Leu Ser Arg Ile Tyr
                165                 170                 175

Lys Phe Arg Gly Lys Ala Trp Asp Trp Glu Val Asp Thr Glu Phe Gly
            180                 185                 190

Asn Tyr Asp Tyr Leu Met Tyr Ala Asp Leu Asp Met Asp His Pro Glu
    195                 200                 205

Val Val Thr Glu Leu Lys Asn Trp Gly Lys Trp Tyr Val Asn Thr Thr
210                 215                 220

Asn Ile Asp Gly Phe Arg Leu Asp Ala Val Lys His Ile Lys Phe Ser
225                 230                 235                 240

Phe Phe Pro Asp Trp Leu Ser Tyr Val Arg Ser Gln Thr Gly Lys Pro
                245                 250                 255

Leu Phe Thr Val Gly Glu Tyr Trp Ser Tyr Asp Ile Asn Lys Leu His
            260                 265                 270

Asn Tyr Ile Thr Lys Thr Asp Gly Thr Met Ser Leu Phe Asp Ala Pro
    275                 280                 285

Leu His Asn Lys Phe Tyr Thr Ala Ser Lys Ser Gly Gly Ala Phe Asp
290                 295                 300

Met Arg Thr Leu Met Thr Asn Thr Leu Met Lys Asp Gln Pro Thr Leu
305                 310                 315                 320

Ala Val Thr Phe Val Asp Asn His Asp Thr Glu Pro Gly Gln Ala Leu
                325                 330                 335

Gln Ser Trp Val Asp Pro Trp Phe Lys Pro Leu Ala Tyr Ala Phe Ile
            340                 345                 350

Leu Thr Arg Gln Glu Gly Tyr Pro Cys Val Phe Tyr Gly Asp Tyr Tyr
    355                 360                 365
```

```
-continued

Gly Ile Pro Gln Tyr Asn Ile Pro Ser Leu Lys Ser Lys Ile Asp Pro
        370                 375                 380

Leu Leu Ile Ala Arg Arg Asp Tyr Ala Tyr Gly Thr Gln His Asp Tyr
385                 390                 395                 400

Leu Asp His Ser Asp Ile Ile Gly Trp Thr Arg Glu Gly Gly Thr Glu
                405                 410                 415

Lys Pro Gly Ser Gly Leu Ala Ala Leu Ile Thr Asp Gly Pro Gly Gly
                420                 425                 430

Ser Lys Trp Met Tyr Val Gly Lys Gln His Ala Gly Lys Val Phe Tyr
        435                 440                 445

Asp Leu Thr Gly Asn Arg Ser Asp Thr Val Thr Ile Asn Ser Asp Gly
        450                 455                 460

Trp Gly Glu Phe Lys Val Asn Gly Gly Ser Val Ser Val Trp Val Pro
465                 470                 475                 480

Arg Lys Thr Thr Val Ser Thr Ile Ala Arg Pro Ile Thr Thr Arg Pro
                485                 490                 495

Trp Thr Gly Glu Phe Val Arg Trp Thr Glu Pro Arg Leu Val Ala Trp
                500                 505                 510

Pro
```